July 12, 1960 G. MOE ET AL 2,944,951
METHOD OF PREPARING TETRA-LOWER ALKYL DIBORANE COMPOUNDS
Filed Nov. 22, 1954

INVENTORS
GEORGE MOE,
ROBERT D. SCHULTZ,
JOSEPH L. SHEPHERD,
THOMAS M. CROMWELL

BY
*D. Gordon Angus*
ATTORNEY

2,944,951
METHOD OF PREPARING TETRA-LOWER ALKYL DIBORANE COMPOUNDS

George Moe, Puente, Robert D. Schultz, East Whittier, Joseph L. Shepherd, Glendale, and Thomas M. Cromwell, Covina, Calif., assignors to Aerojet-General Corporation, Azusa, Calif., a corporation of Ohio Filed Nov. 22, 1954, Ser. No. 470,240

12 Claims. (Cl. 204—165)

This invention relates to a new and improved method for preparing tetra-alkyl diboranes.

When added to hydrocarbon fuels such as gasoline, in amounts corresponding to about 1% by weight, the normally liquid tetra-alkyl diboranes have been found to dramatically improve the combustion characteristics of such fuels in internal combustion engines. Tetra-alkyl diboranes cause more complete combustion which in turn results in higher engine efficiency and a reduction in noxious exhaust vapors.

It is known, for example, that boron trialkyl and diborane react to form tetra-alkyl diborane. However, diborane is expensive and available only in limited quantities, which makes impractical large scale production of tetra-alkyl diborane.

We have now found that tetra-alkyl diborane is obtained in high yield and from readily available starting materials by reacting boron trialkyl and hydrogen in a silent discharge tube, in accordance with the general reaction scheme set forth below:

$$B(R)_3 + H_2 \rightarrow B_2H_2(R)_4$$

wherein R is an alkyl radical.

The silent discharge tubes used in the practice of this invention are discharge tubes wherein the electrodes are separated from the gas space by insulated layers, and which are energized by an alternating high potential applied across the electrodes. Such discharge tubes are commonly used in the production of ozone.

Figure 1:
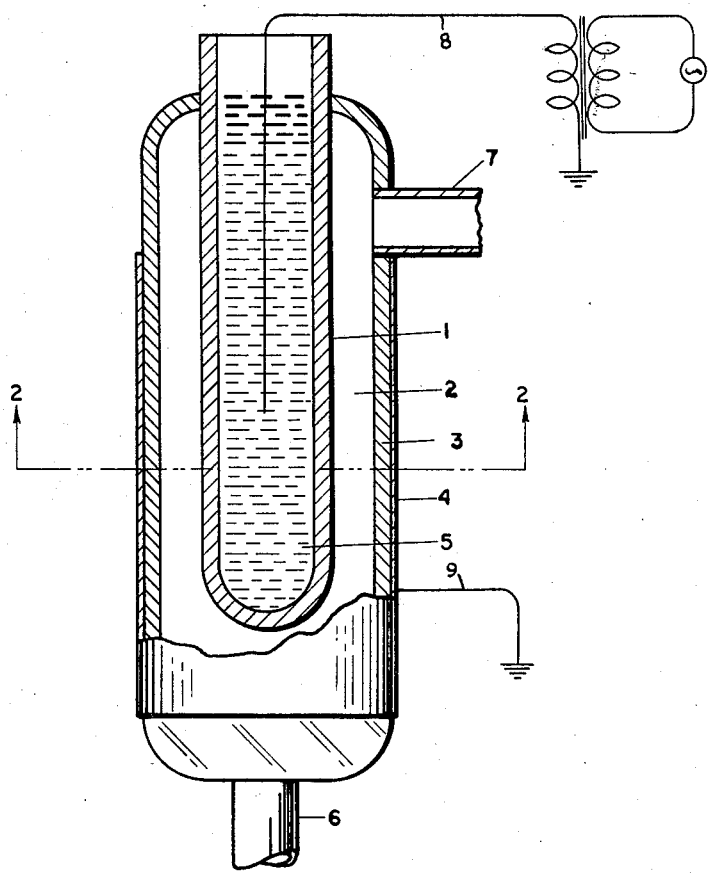

In Figure 1, a diagram of a typical silent discharge tube is shown, comprising two concentric glass tubes, two electrodes and a gas space. The inner glass tube 1 is filled with an electrolyte 5 and the outer glass tube 3 is coated with a metal shim 4. Between the exterior surface of the inner glass tube 1 and the interior surface of the glass tube 3 is a gas space 2 into which opens gas inlet 7 and gas outlet 6. The discharge tube is energized by electric current of high voltage applied as shown by means of leads 8 and 9.

Figure 2:
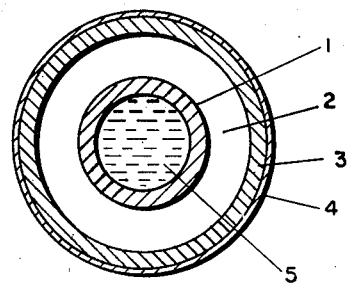

Figure 2 shows a cross sectional view of the silent discharge tube taken at line 2—2 of Figure 1. The two concentric glass tubes 1 and 3 with gas space 2 between are shown. The inner glass tube 1 is filled with an electrolyte 5 and the outer glass tube 3 is wrapped with a metal foil or shim 4.

Figures 1 and 2 illustrate only one of the many commercially available silent discharge tubes which may be employed in the practice of this invention. It should be understood that silent discharge tubes having different dimensions and arrangements, and employing various electrode materials, for example, metals and alloys such as copper, brass, Nichrome, silver, zinc, aluminum, etc., inorganic salts such as sodium nitrate, copper sulfate, potassium chloride, mercurous chloride, and various insulating materials such as ceramics or other dielectrics, can also be used.

In operating the discharge tube to produce tetra-alkyl diboranes, a mixture of hydrogen and boron trialkyl is placed in the gas space and an alternating high potential is applied across the electrodes. We have found that optimum results are obtained when the gas mixture has a mole ratio of hydrogen to boron trialkyl of from about 1:1 to about 10:1 and the potential drop:gas pressure ratio in the discharge tube is from about 3 volts/1 mm. gap/1 mm. gas pressure to about 30 volts/1 mm. gas pressure. The reaction is preferably conducted at a gas pressure above about 100 mm. mercury. The residence time producing optimum yields of tetraalkyl diborane depends upon the pressure of the gas, the magnitude of the potential and the width of the gap. Usually residence times of from about half a minute to about 4 minutes are employed when the gas pressure is from about 100 to about 700 mm. mercury, the gap width about 3 mm. to about 5 mm. and potentials from about 7,500 to about 10,000 volts. Preferred potential/gap width ratios at gas pressures of from about 100 to about 700 mm. Hg are from about 1,500 to about 3,000 volts/mm.

To more clearly illustrate the invention, the following examples are presented. It should be understood, however, that these examples are presented merely as a means of illustration, and are not intended to limit the scope of the invention in any way.

EXAMPLE I

*Preparation of tetramethyl-diborane at 8.3 volts/1 mm. gap/1 mm. gas pressure ratio*

A mixture of hydrogen and boron trimethyl in a mole ratio of 5 to 1 and containing 0.570 gm. $B(CH_3)_3$ was passed through a discharge tube. The gas pressure (450 mm. mercury) and flow-rate was constant over the 25 minute period producing a residence time of 185 seconds. The discharge tube used consisted of two concentric tubes; the inner tube had an outside diameter of 24 mm., and the outer tube had an inside diameter of 32 mm. The annular space was 4 mm. The inner tube was filled with an aqueous sulfate solution and served as one electrode, while the outer electrode consisted of brass shim material, 0.005 in. thick, wrapped around the outer tube. The electrodes were 75 cm. long. A potential of 15,000 volts and a power outlay of 22 watts was applied between the electrodes.

The resultant material was analyzed and it was found that 39% of the boron trimethyl was converted in the discharge. One of the conversion products was tetramethyl diborane which resulted in an 18% yield.

EXAMPLE II

To better illustrate the invention, a series of operating conditions using discharge tubes having 3 cm. and 5 cm. gaps but otherwise being as described in Example I, and the results obtained, are shown in Table I.

TABLE I

|  | Run 1 | Run 2 | Run 3 | Run 4 |
|---|---|---|---|---|
| Mole Ratio, $H_2/B(CH_3)_3$ | 5:1 | 5:1 | 5:1 | 5:1 |
| Voltage | 8,000 | 10,000 | 7,500 | 7,500 |
| Pressure, mm./Hg | 490 | 150 | 550 | 410 |
| Power, watts | 9 | 10 | 5 | 6 |
| Distance between electrodes (mm.) | 5 | 3 | 3 | 3 |
| Residence Time (sec.) | 216 | 125 | 75 | 78 |
| Percent Conv. of $B(CH_3)_3$ | 16 | 76 | 4.6 | 4.0 |
| Percent Yield of $B_2H_2(CH_3)_4$ | 41 | 21 | 71 | 24 |

EXAMPLE III

Table II presents the operating conditions and the results obtained by recycling mixtures of hydrogen and boron trimethyl through the discharge tube employed in Example II.

TABLE II

| | Run 1 | Run 2 | Run 3 | Run 4 |
|---|---|---|---|---|
| Mole Ratio, $H_2/B(CH_3)_3$ | 5:1 | 8:1 | 5:1 | 5:1 |
| No. of Passes | 3.5 | 6 | 3 | 1 |
| Voltage | 10,000 | 8,000 | 8,000 | 10,000 |
| Pressure, mm./Hg | 570 | 583 | 597 | 527 |
| Power, watts | 11 | 11 | 11 | 11 |
| Residence Time, sec./pass | 42 | 32 | 28 | |
| Distance between electrodes (mm.) | 3 | 3 | 3 | 5 |
| Percent Conv. of $B(CH_3)_3$ | 32 | 24 | 21 | 23 |
| Percent Yield of $B_2H_2(CH_3)_4$ | 46.7 | 77 | 64 | 89 |

The percentage yields in Tables I and II are based upon the amount of boron trimethyl undergoing reaction.

It is apparent from the above discussion that the tetra-alkyl diboranes, for example, the tetra-lower alkyl diboranes, may be conveniently prepared from readily available starting materials and by a process well adapted for commercial production by merely reacting boron trialkyl such as a boron tri-lower alkyl and hydrogen in a silent discharge tube, according to the teachings of this invention.

We claim:

1. The method of preparing tetra-lower alkyl diborane compounds which comprises subjecting a mixture of hydrogen and a boron tri-lower alkyl compound to the discharge produced by a silent discharge tube.

2. The method of preparing tetra-lower alkyl diborane compounds which comprises subjecting a mixture of hydrogen and a boron tri-lower alkyl compound to the discharge produced by a silent discharge tube having electrodes separated from the gas space by insulating layers, and energized by an alternating potential.

3. The method of preparing tetra-lower alkyl diboranes which comprises subjecting a mixture of hydrogen and a boron tri-lower alkyl compound to the discharge produced by a silent discharge tube having electrodes separated from the gas space by insulating layers and energized by an alternating potential of from about 3 volts/mm. gap/mm. of Hg gas pressure to about 30 volts/mm. gap/mm. of Hg gas pressure.

4. The method of preparing tetra-lower alkyl diboranes which comprises subjecting a mixture of hydrogen and a boron tri-lower alkyl compound at a gas pressure of from about 100 mm. to about 700 mm. of Hg, to the discharge produced by a silent discharge tube having electrodes separated from the gas space by insulating layers and energized by an alternating potential of from about 3 volts/mm. gap/mm. of Hg gas pressure to about 30 volts/mm. gap/mm. of Hg gas pressure.

5. The method of claim 4 wherein the mole ratio of hydrogen to said boron tri-lower alkyl compound is from about 1:1 to about 10:1.

6. The method of preparing tetra-lower alkyl diboranes which comprises subjecting a mixture of hydrogen and a boron tri-lower alkyl compound at a gas pressure of from about 100 mm. to about 700 mm. of Hg, to the discharge produced by a silent discharge tube having electrodes separated from the gas space by insulating layers and energized by an alternating potential of from about 1,500 volts to about 3,000 volts/mm. gap width.

7. The method of preparing tetra-methyl diborane which comprises subjecting a mixture of boron trimethyl and hydrogen to the discharge produced by a silent discharge tube.

8. The method of preparing tetra-methyl diborane which comprises subjecting a mixture of boron trimethyl and hydrogen to the discharge produced by a silent discharge tube having electrodes separated from the gas space by insulating layers and energized by an alternating potential.

9. The method of preparing tetra-methyl diborane which comprises subjecting a mixture of boron trimethyl and hydrogen to the discharge produced by a silent discharge tube having electrodes separated from the gas space by insulating layers and energized by an alternating potential of from about 3 volts/mm. gap/mm. of Hg gas pressure to about 30 volts/mm. gap/mm. of Hg gas pressure.

10. The method of preparing tetra-methyl diborane which comprises subjecting a mixture of boron trimethyl and hydrogen, at a gas pressure of about 100 mm. to about 700 mm. of Hg, to the discharge produced by a silent discharge tube having electrodes separated from the gas space by insulating layers and energized by an alternating potential of from about 3 volts/mm. gap/mm. of Hg gas pressure to about 30 volts/mm. gap/mm. of Hg gas pressure.

11. The method of claim 10 wherein the mole ratio of hydrogen to boron trimethyl is from about 1:1 to about 10:1.

12. The method of preparing tetra-methyl diborane which comprises subjecting a mixture of boron trimethyl and hydrogen, at a gas pressure of from about 100 mm. to about 700 mm. of Hg, to the discharge produced by a silent discharge tube having electrodes separated from the gas space by insulating layers and energized by an alternating potential of from about 1,500 volts to about 3,000 volts/mm. gap width.

References Cited in the file of this patent

UNITED STATES PATENTS 2,732,338     Moody     Jan. 24, 1956

OTHER REFERENCES

"The Electrochemistry of Gases and Other Dielectrics," by G. Glockler and S. C. Lind, John Wiley & Sons, N.Y. (1939), pages 29–35.

"Boron Hydrides and Related Compounds," by W. H. Schechter et al., Dept. of the Navy, Bureau of Aeronautics, declassified January 5, 1954, pages 27, 30.

"The Electric Arc," by Hertha Ayrton. Published by The Electrician, London. Library date July 28, 1903, page 297.

"Proceedings of Physical Society" of London, vol. 40 (1927–28), pages 79, 84.

"Journal of American Chemical Society," vol. 53, December 1931, pages 4321–4332.

"Berichte der Deutsche Chemische Gesellschaft," 69B, pages 1469–75 (1936).